(12) United States Patent
Miladinovic et al.

(10) Patent No.: US 8,750,447 B2
(45) Date of Patent: Jun. 10, 2014

(54) SYSTEMS AND METHODS FOR VARIABLE THRESHOLDING IN A PATTERN DETECTOR

(75) Inventors: Nenad Miladinovic, Campbell, CA (US); Haitao Xia, San Jose, CA (US); Shaohua Yang, Santa Clara, CA (US)

(73) Assignee: LSI Corporation, San Jose, CA (US)

( * ) Notice: Subject to any disclaimer, the term of this patent is extended or adjusted under 35 U.S.C. 154(b) by 637 days.

(21) Appl. No.: 12/917,756

(22) Filed: Nov. 2, 2010

(65) Prior Publication Data
US 2012/0106607 A1    May 3, 2012

(51) Int. Cl.
H04L 7/06    (2006.01)
(52) U.S. Cl.
USPC .......................................... 375/368
(58) Field of Classification Search
USPC .................................. 375/365, 368
See application file for complete search history.

(56) References Cited

U.S. PATENT DOCUMENTS

| | | | |
|---|---|---|---|
| 3,654,390 A * | 4/1972 | Puckette | 375/368 |
| 5,278,846 A | 1/1994 | Okayama et al. | |
| 5,325,402 A | 6/1994 | Ushirokawa | |
| 5,392,299 A | 2/1995 | Rhines et al. | |
| 5,471,500 A | 11/1995 | Blaker et al. | |
| 5,513,192 A | 4/1996 | Janku et al. | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |
| 5,717,706 A | 2/1998 | Ikeda | |
| 5,802,118 A | 9/1998 | Bliss et al. | |
| 5,844,945 A | 12/1998 | Nam et al. | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | McCallister et al. | |
| 6,023,783 A | 2/2000 | Divsalar et al. | |
| 6,029,264 A | 2/2000 | Kobayashi et al. | |
| 6,041,432 A | 3/2000 | Ikeda | |
| 6,065,149 A | 5/2000 | Yamanaka | |
| 6,097,764 A | 8/2000 | McCallister et al. | |

(Continued)

FOREIGN PATENT DOCUMENTS

| | | |
|---|---|---|
| EP | 0522578 | 1/1993 |
| EP | 1814108 | 8/2007 |

(Continued)

OTHER PUBLICATIONS

U.S. Appl. No. 11/461,026, filed Jul. 31, 2006, Tan, Weijun.

(Continued)

*Primary Examiner* — Kevin Kim
(74) *Attorney, Agent, or Firm* — Hamilton DeSanctis & Cha

(57) ABSTRACT

Various embodiments of the present invention provide systems and methods for pattern identification. As an example, a pattern detection circuit is discussed that include: a distance calculation circuit operable to calculate a distance value corresponding to a difference between a first pattern and a second pattern; a threshold comparator circuit operable to compare the distance value to a variable threshold value; and a threshold value calculation circuit. The threshold value calculation circuit is operable to modify the variable threshold value based at least in part on the distance value.

20 Claims, 13 Drawing Sheets

(56) References Cited

U.S. PATENT DOCUMENTS

| | | | |
|---|---|---|---|
| 6,145,110 | A | 11/2000 | Khayrallah |
| 6,216,249 | B1 | 4/2001 | Bliss et al. |
| 6,216,251 | B1 | 4/2001 | McGinn |
| 6,229,467 | B1 | 5/2001 | Eklund et al. |
| 6,266,795 | B1 | 7/2001 | Wei |
| 6,317,472 | B1 | 11/2001 | Choi et al. |
| 6,351,832 | B1 | 2/2002 | Wei |
| 6,377,610 | B1 | 4/2002 | Hagenauer et al. |
| 6,381,726 | B1 | 4/2002 | Weng |
| 6,438,717 | B1 | 8/2002 | Butler et al. |
| 6,473,878 | B1 | 10/2002 | Wei |
| 6,476,989 | B1 | 11/2002 | Chainer et al. |
| 6,625,775 | B1 | 9/2003 | Kim |
| 6,657,803 | B1 | 12/2003 | Ling et al. |
| 6,671,404 | B1 | 12/2003 | Kawatani et al. |
| 6,748,034 | B2 | 6/2004 | Hattori et al. |
| 6,757,862 | B1 | 6/2004 | Marianetti |
| 6,785,863 | B2 | 8/2004 | Blankenship et al. |
| 6,788,654 | B1 | 9/2004 | Hashimoto et al. |
| 6,810,502 | B2 | 10/2004 | Eidson |
| 6,980,382 | B2 | 12/2005 | Hirano et al. |
| 6,986,098 | B2 | 1/2006 | Poeppelman |
| 7,010,051 | B2 | 3/2006 | Murayama et al. |
| 7,047,474 | B2 | 5/2006 | Rhee et al. |
| 7,058,873 | B2 | 6/2006 | Song et al. |
| 7,073,118 | B2 | 7/2006 | Greenberg et al. |
| 7,093,179 | B2 | 8/2006 | Shea |
| 7,113,356 | B1 | 9/2006 | Wu |
| 7,173,783 | B1 | 2/2007 | McEwen et al. |
| 7,184,486 | B1 | 2/2007 | Wu et al. |
| 7,191,378 | B2 | 3/2007 | Eroz et al. |
| 7,203,015 | B2 | 4/2007 | Sakai et al. |
| 7,203,887 | B2 | 4/2007 | Eroz et al. |
| 7,236,757 | B2 | 6/2007 | Raghavan et al. |
| 7,257,764 | B2 | 8/2007 | Suzuki et al. |
| 7,310,768 | B2 | 12/2007 | Eidson et al. |
| 7,313,750 | B1 | 12/2007 | Feng et al. |
| 7,370,258 | B2 | 5/2008 | Iancu et al. |
| 7,403,752 | B2 | 7/2008 | Raghaven et al. |
| 7,430,256 | B2 | 9/2008 | Zhidkov |
| 7,502,189 | B2 | 3/2009 | Sawaguchi et al. |
| 7,505,537 | B1 | 3/2009 | Sutardja |
| 7,523,375 | B2 | 4/2009 | Spencer |
| 7,587,657 | B2 | 9/2009 | Haratsch |
| 7,590,168 | B2 | 9/2009 | Raghaven et al. |
| 7,702,989 | B2 | 4/2010 | Graef et al. |
| 7,712,008 | B2 | 5/2010 | Song et al. |
| 7,801,200 | B2 | 9/2010 | Tan |
| 7,802,163 | B2 | 9/2010 | Tan |
| 2003/0063405 | A1 | 4/2003 | Jin et al. |
| 2003/0081693 | A1 | 5/2003 | Raghaven et al. |
| 2003/0087634 | A1 | 5/2003 | Raghaven et al. |
| 2003/0112896 | A1 | 6/2003 | Raghaven et al. |
| 2003/0134607 | A1 | 7/2003 | Raghaven et al. |
| 2004/0071206 | A1 | 4/2004 | Takatsu |
| 2004/0098659 | A1 | 5/2004 | Bjerke et al. |
| 2005/0010855 | A1 | 1/2005 | Lusky |
| 2005/0111540 | A1 | 5/2005 | Modrie et al. |
| 2005/0157780 | A1 | 7/2005 | Werner et al. |
| 2005/0195749 | A1 | 9/2005 | Elmasry et al. |
| 2005/0216819 | A1 | 9/2005 | Chugg et al. |
| 2005/0273688 | A1 | 12/2005 | Argon |
| 2006/0020872 | A1 | 1/2006 | Richardson et al. |
| 2006/0031737 | A1 | 2/2006 | Chugg et al. |
| 2006/0123285 | A1 | 6/2006 | De Araujo et al. |
| 2006/0140311 | A1 | 6/2006 | Ashley et al. |
| 2006/0168493 | A1 | 7/2006 | Song et al. |
| 2006/0195772 | A1 | 8/2006 | Graef et al. |
| 2006/0248435 | A1 | 11/2006 | Haratsch |
| 2006/0256670 | A1 | 11/2006 | Park et al. |
| 2007/0011569 | A1 | 1/2007 | Vila Casado et al. |
| 2007/0047635 | A1 | 3/2007 | Stojanovic et al. |
| 2007/0110200 | A1 | 5/2007 | Mergen et al. |
| 2007/0127606 | A1* | 6/2007 | Ueng et al. ................... 375/343 |
| 2007/0230407 | A1 | 10/2007 | Petrie et al. |
| 2007/0286270 | A1 | 12/2007 | Huang et al. |
| 2008/0049825 | A1 | 2/2008 | Chen et al. |
| 2008/0055122 | A1 | 3/2008 | Tan |
| 2008/0065970 | A1 | 3/2008 | Tan |
| 2008/0069373 | A1 | 3/2008 | Jiang et al. |
| 2008/0168330 | A1 | 7/2008 | Graef et al. |
| 2009/0199071 | A1 | 8/2009 | Graef |
| 2009/0235116 | A1 | 9/2009 | Tan et al. |
| 2009/0235146 | A1 | 9/2009 | Tan |
| 2009/0259915 | A1 | 10/2009 | Livshitz et al. |
| 2009/0273492 | A1 | 11/2009 | Yang et al. |
| 2009/0274247 | A1 | 11/2009 | Galbraith et al. |
| 2010/0002795 | A1 | 1/2010 | Raghaven et al. |
| 2010/0061492 | A1 | 3/2010 | Noelder |
| 2010/0070837 | A1 | 3/2010 | Xu et al. |
| 2010/0164764 | A1 | 7/2010 | Nayak |
| 2010/0185914 | A1 | 7/2010 | Tan et al. |

FOREIGN PATENT DOCUMENTS

| | | |
|---|---|---|
| WO | WO 2006/016751 | 2/2006 |
| WO | WO 2006/134527 | 12/2006 |
| WO | WO 2007/091797 | 8/2007 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2101, Liu, et al.
U.S. Appl. No. 12/887,330, filed Sep. 21, 2010, Zhang, et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/947,931, filed Nov. 17, 2010, Yang.
U.S. Appl. No. 12/947,947, filed Nov. 17, 2010, Ivkovic et al.
U.S. Appl. No. 12/972,942, filed Dec. 20, 2010, Liao et al.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding" [online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gunnam, K et al. "Tech. Note on Iterative LDPC Solutions for Turbo Equal.", K. Gunnam, G. Choi and M. Yeary, TX A&M Tech. Note, Rpt. Dt: Jul. 2006 Avail. online dropzone.tamu.edu.
K. Gunnam et al., "Next Generation iterative LDPC solutions for magnetic recording storage," invited paper. The Asilomar Conference on Signals, Systems, and Computers, Nov. 2008.
Han and Ryan, "Pinning Techniques for Low-Floor Detection/Decoding of LDPC-Coded Partial Response Channels", 5th International Symposium on Turbo Codes &Related Topics, 2008.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Mohsenin et al., "Split Row: A Reduced Complexity, High Throughput LDPC Decoder Architecture", pp. 1-6, printed from www.ece.ucdavis.edu on Jul. 9, 2007.
Sari H et al., "Transmission Techniques for Digital Terrestrial TV Broadcasting" IEEE Communications Magazine, IEEE Service Center NY, NY vol. 33, No. 2 Feb. 1995.
Unk, "Auto threshold and Auto Local Threshold" [online] [retr. May 28, 2010] Retr. from the Internet www.dentristy.bham.ac.uk/landinig/software/autothreshold/autothreshold.html.
Vasic, B., "High-Rate Low-Density Parity-Check Codes Based on Anti-Pasch Affine Geometries," Proc ICC 2002, pp. 1332-1336.

(56) References Cited

OTHER PUBLICATIONS

Vasic, B., "High-Rate Girth-Eight Codes on Rectangular Integer Lattices", IEEE Trans. Communications, vol. 52, Aug. 2004, pp. 1248-1252.

Wang Y et al., "A Soft Decision Decoding Scheme for Wireless COFDM With App. to DVB-T" IEEE Transactions on Consumer elect., IEEE Service Center, NY,NY vo. 50, No. 1 Feb. 2004.

Weon-Cheol L. et al., "Vitierbi Decoding Method Using Channel State Information in COFDM System" IEEE Trans. on Consumer Elect., IEEE Service Center, NY, NY vol. 45 No. 3 08/.

Yeo et al., "VLSI Architecture for Iterative Decoders in Magnetic Storage Channels", Mar. 2001, pp. 748-755, IEEE trans. Magnetics, vol. 37, No. 2.

Youn, "Ber Perf. Due to Irreg. of Row-Weoght Distr. of the Parity-Check Matirx in Irregular LDPC Codes for 10-Gb/s Optical Signals" Journal of Lightwave Tech., vol. 23 Sep. 9, 2005.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VLSI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

\* cited by examiner

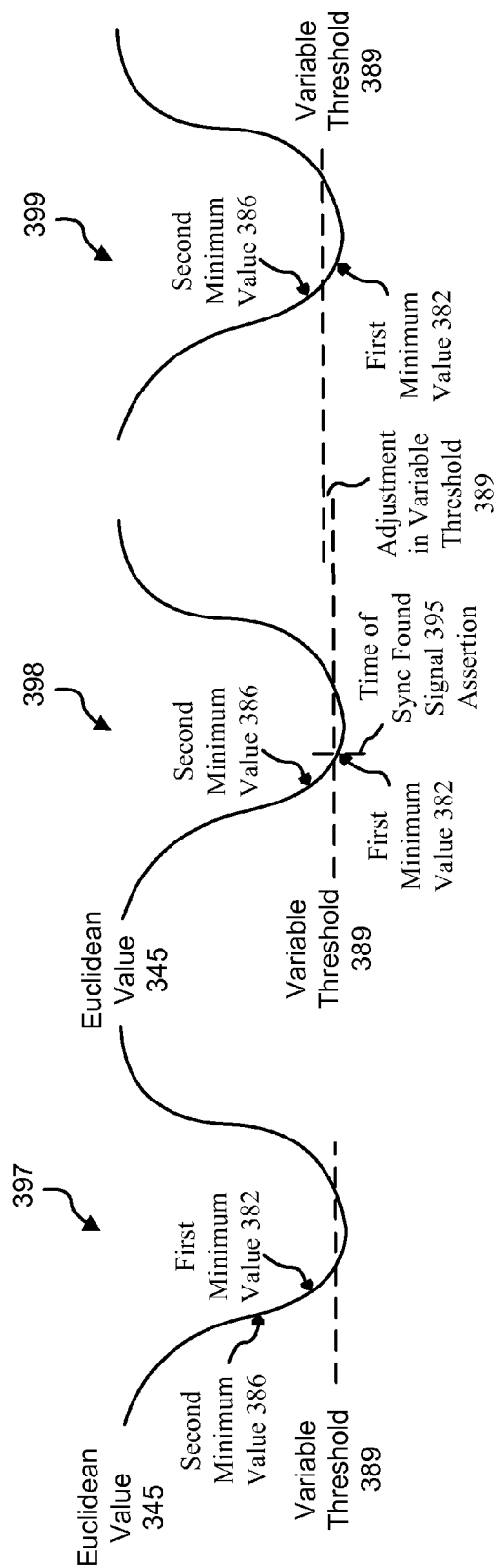

SYSTEMS AND METHODS FOR VARIABLE THRESHOLDING IN A PATTERN DETECTOR

BACKGROUND OF THE INVENTION

The present inventions are related to systems and methods for data processing, and more particularly to systems and methods for detecting patterns in a data stream.

Various circuits have been developed that provide for identifying synchronization marks within a data stream. Identifying a sync mark in a data stream is a critical step in block/frame synchronization in a read channel. The block/frame synchronization is usually achieved by writing a special sequence of bits called sync mark at the beginning of the sector. When detected correctly the sync mark denotes the beginning of the data. The sync mark may be detected, for example, by a Euclidean detector circuit that calculates a Euclidean distance between the sequence of received samples equalized to particular target and ideal samples corresponding to the binary sync mark and given target. This distance is compared to a static threshold, and a sync mark found is declared when the distance is smaller than the static threshold. Such a static threshold comparison approach depends highly upon determining an appropriate threshold for comparison. Where the selected threshold is too high, sync marks will be missed. Alternatively, where the selected threshold is too low, sync marks may be incorrectly identified. Either case is problematic for proper data processing.

Hence, for at least the aforementioned reasons, there exists a need in the art for advanced systems and methods for sync mark identification.

BRIEF SUMMARY OF THE INVENTION

The present inventions are related to systems and methods for data processing, and more particularly to systems and methods for detecting patterns in a data stream.

Various embodiments of the present invention provide pattern detection circuits. The circuits include: a distance calculation circuit operable to calculate a distance value corresponding to a difference between a first pattern and a second pattern; a threshold comparator circuit operable to compare the distance value to a variable threshold value; and a threshold value calculation circuit. The threshold value calculation circuit is operable to modify the variable threshold value based at least in part on the distance value.

In some instances of the aforementioned embodiments, the circuit is implemented as part of an integrated circuit. In various instances of the aforementioned embodiments, the circuit is implemented as part of a storage device or a wireless communication device. Based upon the disclosure provided herein, one of ordinary skill in the art will recognize other implementations that may be done in accordance with different embodiments of the present invention.

In one or more instances of the aforementioned embodiments, the distance value is a first distance value, and the distance calculation circuit is further operable to calculate a second distance value corresponding to a difference between a third pattern and the second pattern. In such instances, the threshold value calculation circuit is operable to modify the variable threshold value based at least in part on the first distance value and the second distance value. In some cases, the second distance value is greater than the variable threshold value.

In various instances of the aforementioned embodiments, the threshold value calculation circuit includes: a first register circuit operable to store the distance value when the distance value is less than a current minimum value in the first register; a second register circuit operable to store the distance value when the distance value is greater than a maximum value currently stored in the second register; and an averaging circuit. The averaging circuit is operable to average a derivative of the maximum value from the second register and a derivative of the minimum value from the first register to yield the variable threshold value, and to provide a resulting average as the variable threshold value. In some such instances, the derivative of the maximum value from the second register is the maximum value from the second register, and the derivative of the minimum value from the first register is the minimum value from the first register.

In yet other instances of the aforementioned embodiments, the threshold value calculation circuit includes: a first register circuit operable to store the distance value when the distance value is less than a current minimum value in the first register; a second register circuit operable to store the distance value when the distance value is greater than a maximum value currently stored in the second register; a first accumulator circuit operable to accumulate the distance values that are less than the variable threshold value and to provide a first accumulated value; a second accumulator circuit operable to accumulate the distance values that are greater than the variable threshold value and to provide a second accumulated value; and a counter circuit operable to count a number of values stored in the first accumulator circuit and the second accumulator circuit. In some cases, the threshold value calculation circuit further includes an averaging circuit that is operable to average the first accumulated value and the second accumulated value to yield an average value, and to divide the average value by the number of values to yield the variable threshold value.

Other embodiments of the present invention provide methods for pattern detection that include: receiving a first data input and a second data input; calculating a difference between the first data input and a defined pattern to yield a first comparison value such that the first comparison value is greater than a variable threshold value; calculating a difference between the second data input and a defined pattern to yield a second comparison value such that the second comparison value is less than the variable threshold value; and modifying the variable threshold value based at least in part on the second comparison value.

In some instances of the aforementioned embodiments, modifying the variable threshold value based at least in part on the second comparison value includes averaging the first comparison value and the second comparison value, and providing the resulting average as the variable threshold value. In other instances of the aforementioned embodiments, modifying the variable threshold value based at least in part on the second comparison value includes: accumulating the second comparison value with at least one other comparison value that was less than a preceding variable threshold value to yield a first accumulated value; accumulating the first comparison value with at least one other comparison value that was greater than a preceding variable threshold value to yield a second accumulated value; averaging the first accumulated value and the second accumulated value, and providing the resulting average as the variable threshold value.

Yet other embodiments of the present invention provide storage devices that include: a storage medium, and a data processing circuit operable to receive a data input derived from the storage medium. The data processing circuit includes: a distance calculation circuit operable to calculate a distance value corresponding to a difference between a first pattern and a second pattern; a threshold comparator circuit operable to compare the distance value to a variable threshold value; and a threshold value calculation circuit. The threshold value calculation circuit is operable to modify the variable threshold value based at least in part on the distance value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 6a-6d graphically represent one process of tuning a variable threshold value based on two prior minimum distances between a received data pattern and a sync mark pattern;

DETAILED DESCRIPTION OF THE INVENTION

The present inventions are related to systems and methods for data processing, and more particularly to systems and methods for detecting patterns in a data stream.

Figure 1:
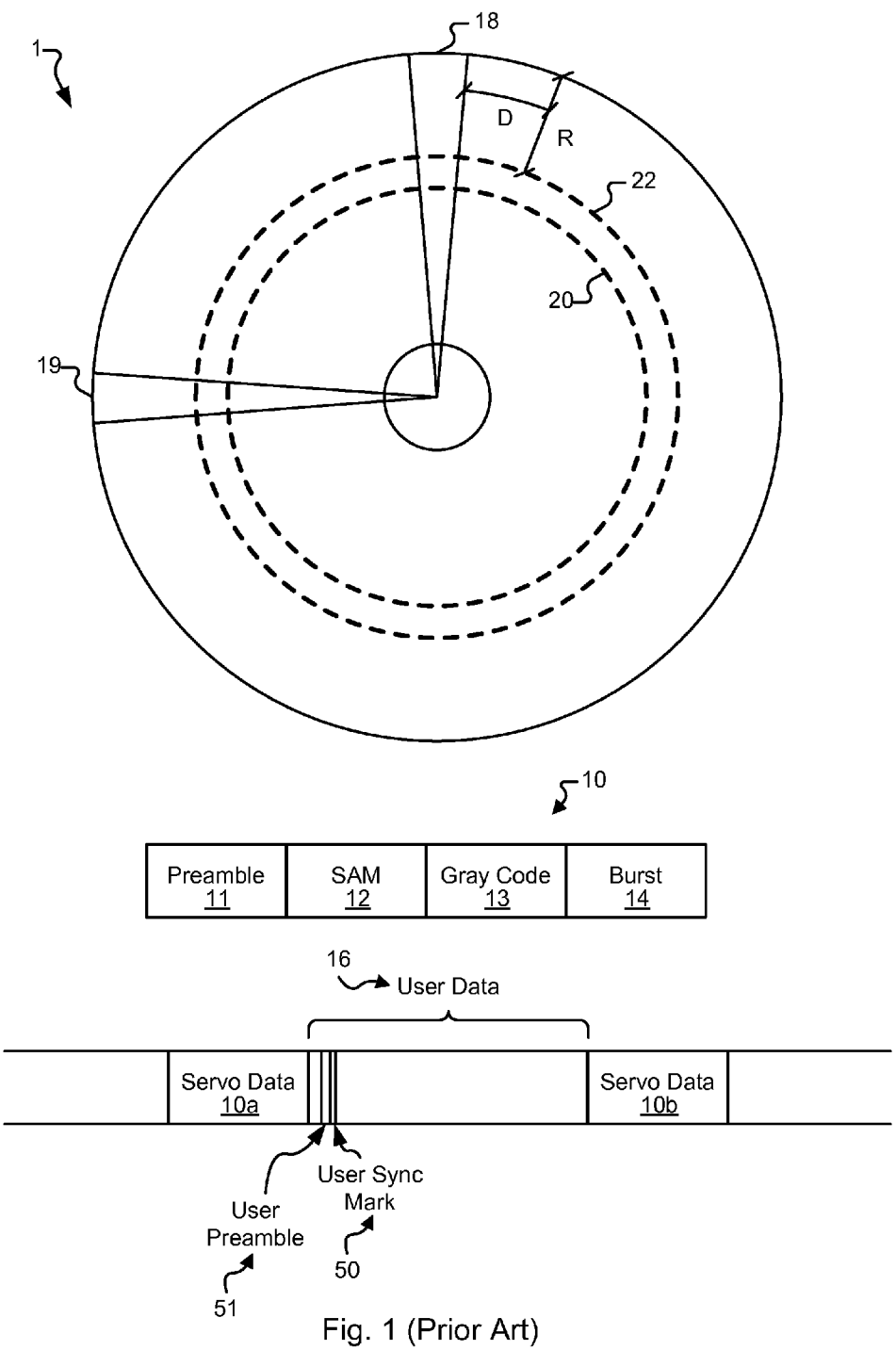
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed. User sync mark 50 is preceded by a user preamble 51.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

Figure 2:
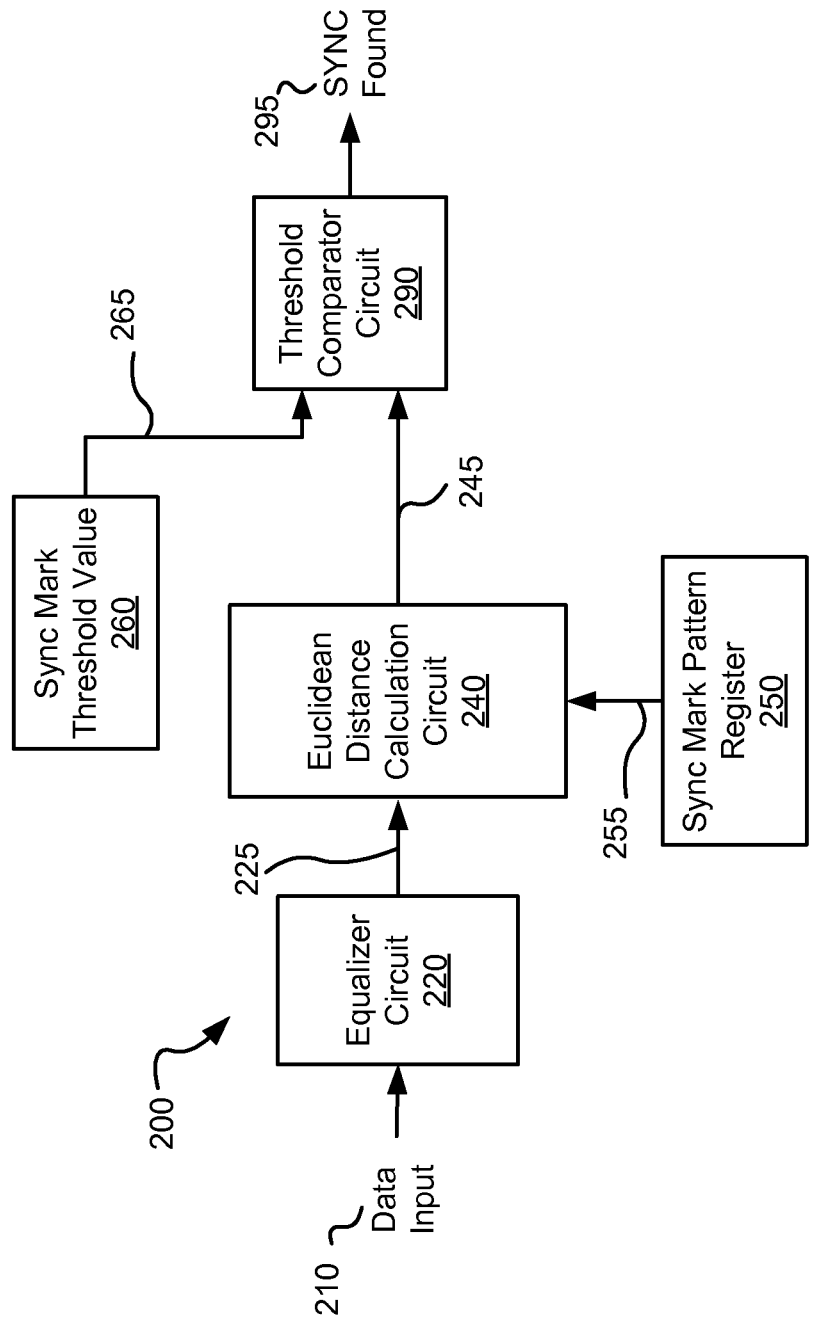
FIG. 2 depicts a prior art static threshold based sync mark detector circuit.

Turning to FIG. 2, a prior art static threshold based sync mark detector circuit 200 is shown. Sync mark detector circuit 200 includes an equalizer circuit 220 that receives a data input 210 and provides an equalized output 225. Equalized output 225 is provided to a Euclidean distance calculation circuit 240 that calculates a distance between the recently received inputs and a sync mark pattern 255 available from a sync mark pattern register 250. A calculated Euclidean distance value 245 is provided to a threshold comparator circuit 290 where it is compared with a static threshold value 265 available from a sync mark threshold value circuit 260. When Euclidean distance value 245 is identified as less than static threshold value 265, threshold comparator circuit 290 asserts a sync found signal 295.

Such a circuit is very sensitive to the threshold value set by sync mark threshold value circuit 260. Where static threshold value 265 is set too high, sync marks will be missed. In contrast, where static threshold value 265 is set too low, sync found signal 295 will be asserted when a sync mark has not actually been found.

Various embodiments of the present invention provide for systems, circuits, and methods that provide for a variable threshold value. As used herein, the term "variable threshold value" may be any threshold value that is changeable based upon a feedback value. Thus, a variable threshold value may be, but is not limited to, a threshold signal calculated based upon a prior threshold value. Based upon the disclosure provided herein, one of ordinary skill in the art will recognize a variety of variable threshold values that may be used in relation to different embodiments of the present invention.

Figure 3:
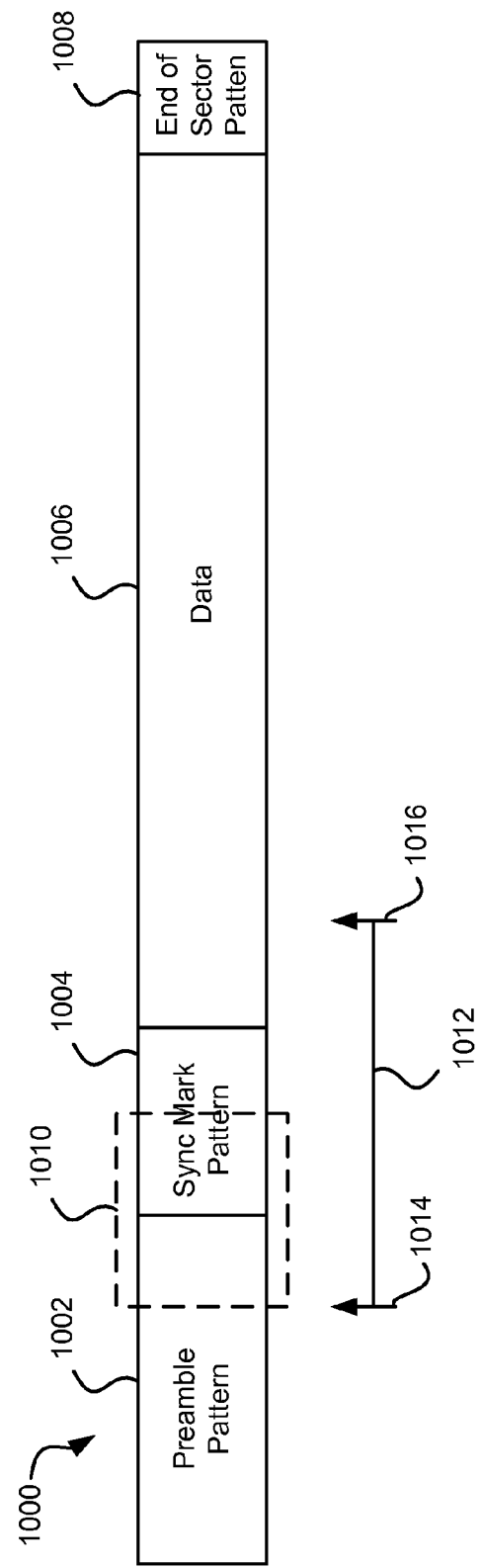
FIG. 3 graphically depicts a data stream over which a pattern is searched and detected.

FIG. 3 graphically depicts a data stream 1000 over which a pattern is searched and detected. As shown, data stream 100 includes a preamble pattern 1002, a sync mark pattern 1004, a data region 1006 and an end of sector pattern 1008. In this case, where sync mark pattern 1004 is of interest, a region of interest 1012 is defined that begins at a start location 1014 before sync mark pattern 1004 is expected and continues to an end location 1016 after the expected end of sync mark pattern 1004. A sliding window 1010 (shown in dashed lines) and corresponding to the length of sync mark pattern 1004 begins at start location 1014 and slides one bit position to the right as each new bit position of data is received. This sliding continues until end location 1016. A pattern detection process is performed for each time sliding window 1010 is moved.

Figure 4:
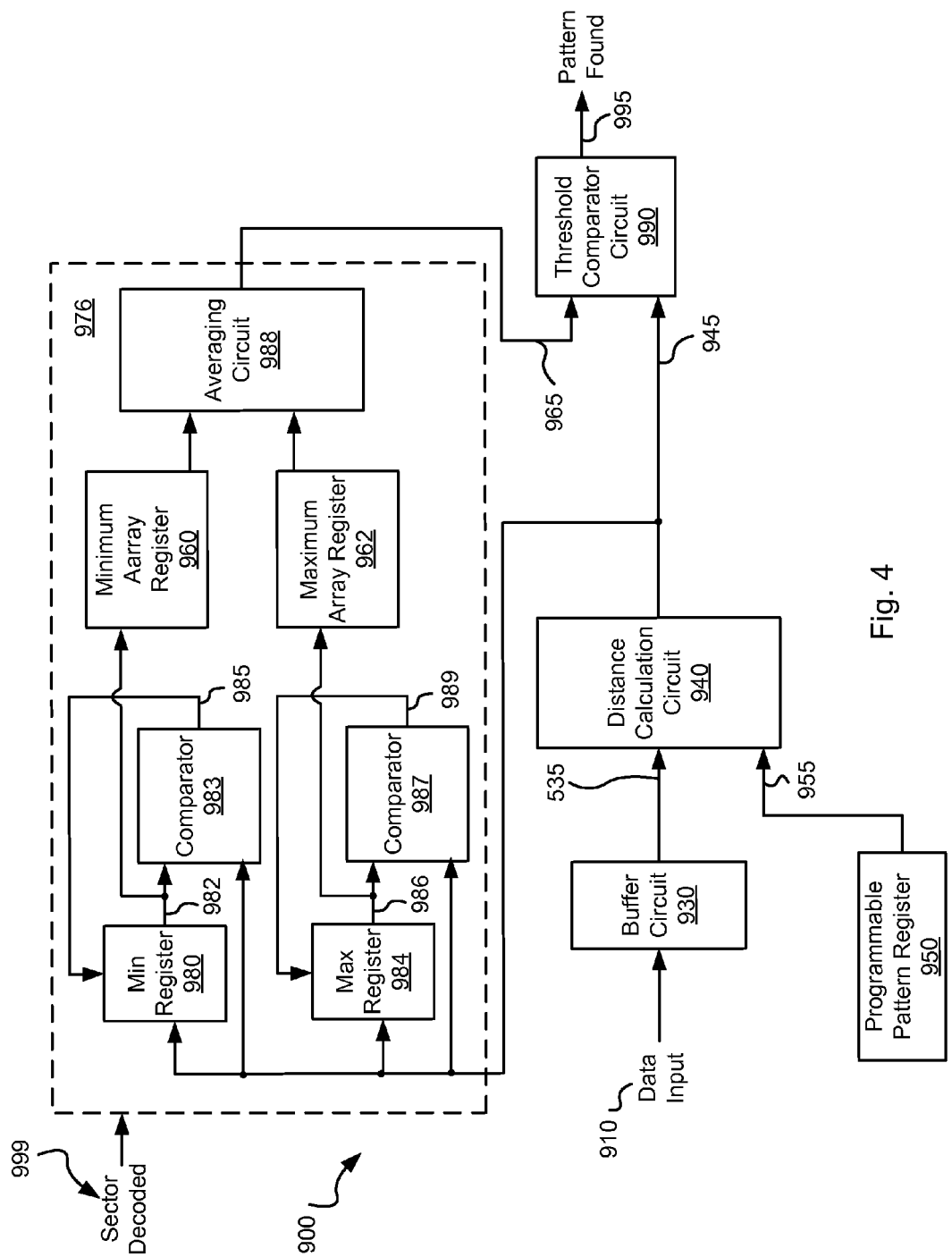
FIG. 4 shows a variable threshold based pattern detector circuit in accordance with some embodiments of the present invention.

Turning to FIG. 4, a variable threshold based pattern detector circuit 900 is shown in accordance with some embodiments of the present invention. Pattern detector circuit 900 may be used to detect any particular pattern. For example, pattern detector circuit 900 may be used to detect an end of preamble pattern, a sync mark pattern, or another defined pattern. Pattern detector circuit 900 includes a buffer circuit 930 receives a data input 910 and stores the data input one a first in, first out basis. The length of buffer circuit 930 corresponds to the length of a sliding window over which a pattern detection process will be performed. The first in, first out operation of buffer circuit 930 operates to implement the sliding window. Based upon the disclosure provided herein, one of ordinary skill in the art will recognize a variety of alternative circuits that may be used to implement a sliding window. Data input 910 may be a series of digital values derived from an upstream source such as, for example, a storage medium or a transmission medium. Based upon the disclosure provided herein, one of ordinary skill in the art will recognize a variety of sources for data input 910. In one particular embodiment of the present invention, data input 910 is derived from storage medium, and may come from an output of an equalizer circuit (not shown), an analog to digital converter circuit (not shown), or another circuit.

A buffer output 935 from buffer circuit 930 is provided to a distance calculation circuit 940 that calculates a distance between buffered output 935 and a programmed pattern 955 available from a programmable pattern register 950. Distance value 945 is calculated in accordance with the following equation:

$$\text{Distance Value} = \sum_{m=0}^{L-1} (Y(i+m) - \text{pattern}(m) - \text{offset}(i)),$$

Where L corresponds to the length of the sliding window, I indicates a particular window of data maintained in buffer circuit 930, Y(i) corresponds to the first bit positioning the sliding window of data available from buffer output 935, pattern corresponds to the programmed pattern 955, and offset corresponds to a DC offset evident across the samples stored in buffer circuit 930. The offset term is calculated in accordance with the following equation:

$$\text{offset} = \frac{1}{L}\sum_{m=0}^{L-1} Y(m).$$

As a side note, programmed pattern 955 is computed using the following equations:

$$\hat{Y}(m) = \sum_{v=1}^{K} (t_{K-v} \times b_{v+m}),$$

where $t_v$ represents tap values of a desired target of an equalizer circuit where the output of the equalizer circuit is used as data input 910, the length of the target is K, and $b_v$ is the pattern to be detected in terms of +1 or −1. The DC offset is calculated in accordance with the following equation:

$$\text{pattern offset} = \frac{1}{L}\sum_{m=0}^{L-1} \hat{Y}(m).$$

Based on this, the pattern can be calculated as:

pattern=$\hat{Y}(m)$−pattern offset.

Distance value 945 is provided to a threshold comparator circuit 990 where it is compared with a variable threshold value 965 that is updated as described below. When distance value 945 is identified as less than variable threshold value 965, threshold comparator circuit 990 asserts a pattern found signal 995. Threshold comparator circuit 990 may be any circuit known in the art that is capable of comparing at least two values and providing an output indicative of the comparison. For each movement of the sliding window (represented as time index i), an updated distance value 945 is calculated. As the sliding window (represented by buffer circuit 930) slides closer and closer to the pattern to be detected distance value 945 decreases.

Variable threshold value 965 is provided by a threshold generation circuit 976. Threshold generation circuit 976 includes a minimum register 980 that provides a minimum value 982, and a maximum register 984 that provides a maximum value 986. A comparator 983 compares minimum value 982 with distance value 945 to yield a comparator output 985, and a comparator 987 compares maximum value 986 with distance value 945 to yield a comparator output 989.

In operation, both maximum register 984 and minimum register 980 are initialized to relatively high values. Where comparator output 985 indicates that distance value 945 is less than or equal to minimum value 982, then minimum value 982 is written to maximum register 984, and distance value 945 is written to minimum register 980. Alternatively, where comparator output 985 indicates that distance value 945 is greater than minimum value 982 and comparator output 987 indicates that distance value 945 is less than maximum value 986, the value in minimum register 980 is left unchanged, and the value in maximum register 984 is set equal to distance value 945. Alternatively, where comparator output 985 indicates that distance value 945 is greater than minimum value 982 and comparator output 987 indicates that distance value 945 is greater than or equal to maximum value 986, the values in both maximum register 984 and minimum register 980 remain unchanged. This process is repeated for each sector of input data that is processed resulting in both a minimum value and a maximum value for each respective sector.

Where a given sector is properly decoded as indicated by a sector decoded signal 999 from a down stream data processing circuit (not shown), the values in maximum register 984 and minimum register 980 are considered valid. Where the data processing does not converge as indicated by sector decoded signal 999, the values are not considered valid and are not used to calculate an updated variable threshold value 965. In alternative embodiments, the values are considered valid regardless of the status of sector decoded signal 999. Such an approach does, however, incur some risk due to the possibility of a misidentified pattern resulting in errant values. S an advantage, such an approach does reduce latency.

When maximum value 986 and minimum value 982 are considered valid as previously discussed, the values are stored to an array of values at a location corresponding to the current sector. There are additionally two more registers—a maximum array register 962 and a minimum array register 960. Minimum array register 960 includes the minimum values corresponding to each sector that were stored in minimum register 980 at the end of processing the sector, and maximum array register 962 includes the maximum values corresponding to each sector that were stored in maximum register 984 at the end of processing the sector.

After a programmable number (N) of sectors have been processed, the values from minimum array register 960 and the values from maximum array register 962 are used to calculate an updated variable threshold value 965. This can be done in one of two ways, where maximum array register 962 and minimum array register 960 includes the maximum values and minimum values for all N sectors, then variable threshold value 965 may be calculated in accordance with the following equation:

$$\text{variable threshold value 965} = \frac{\sum_{i=1}^{N} \text{minimum array register}(i) + \sum_{i=1}^{N} \text{maximum array register}(i)}{2 \times N},$$

where i indicates each sector entry in the respective arrays. Alternatively, to avoid having to store all of the maximum and minimum values corresponding to each sector, only the minimum value from maximum register 984 across all sectors is stored to maximum array register 962 and only the minimum value across all of the sectors is stored to minimum array register 960. In this case, variable threshold value 965 may be calculated in accordance with the following equation:

$$\text{variable threshold value 965} = \frac{\text{Maximum} + \text{Minimum}}{2},$$

where Maximum is the value from maximum array register 962 and Minimum is the value from minimum array register 960.

The initial value of variable threshold value 965 is pre-calculated using ideal channel conditions. As discussed above, this value changes over the operation of the device and is adapted to the environmental and operational characteristics of the device.

Figure 5A:
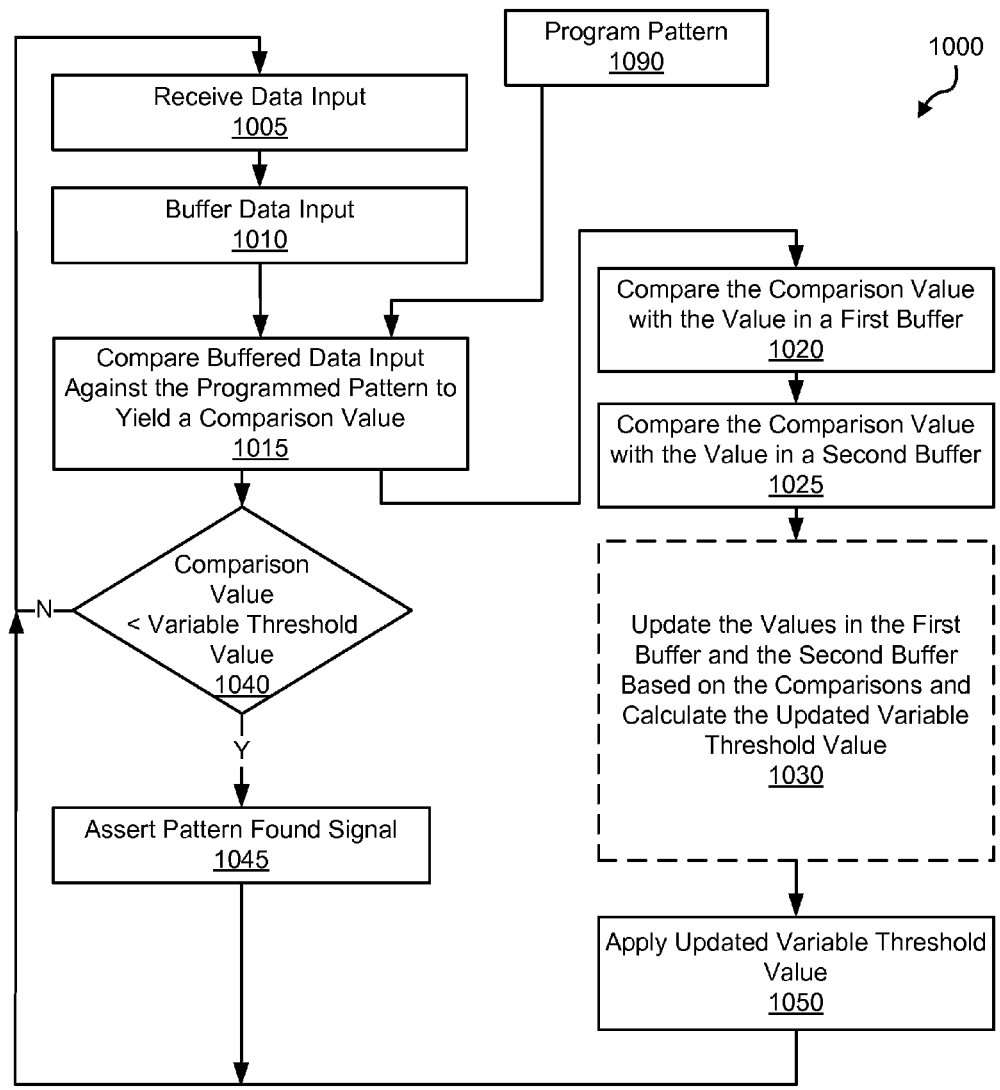
FIGS. 5a-5c are flow diagrams showing methods in accordance with some embodiments of the present invention for performing variable threshold based pattern detection.

FIG. 5*a* is a flow diagram 1000 showing a method in accordance with one or more embodiments of the present invention for performing variable threshold based pattern detection. Following flow diagram 1000, a data input is received (block 1005) and is buffered (block 1010). The data input may be a series of digital values derived from an upstream source. For example, the series of digital value may represent samples of data derived from a storage medium. Alternatively, the series of digital values may represent samples of a data signal received via a transmission medium. Based upon the disclosure provided herein, one of ordinary skill in the art will recognize a variety of possible sources of the data input.

A defined pattern to be detected is programmed (block 1090). The buffered data input is compared against the programmed pattern to yield a comparison value (block 1015). The comparison value indicates a level of similarity between the buffered data input and the defined sync mark pattern. As the similarity increases, the comparison value decreases. In one particular embodiment of the present invention, comparing the buffered data input with the defined sync mark pattern includes calculating a Euclidean distance between the two patterns. In such a case, calculating the Euclidean distance is done by squaring the difference between respective bit positions in the compared values, and then summing the resulting squares in accordance with the following equation:

$$\text{Euclidean Distance} = \sum_{i=0}^{k} (BO_i - SMP_i)^2$$

where k is the number of bit positions to be compared (e.g., the length of a sync mark pattern or end of preamble pattern to be detected), $BO_i$ is a value of the buffered data input at a bit position i, and $SMP_i$ is a value of the sync mark pattern at a bit position i.

A value previously stored in a first min buffer is compared with the comparison value (block 1020), and a value previously stored in a second min buffer is compared with the comparison value (block 1025). The results of the aforementioned comparisons are used to update a variable threshold value (block 1030) as more fully discussed below. The updated variable threshold value is applied for use in relation to comparison with the comparison value (block 1040). The comparison value is also compared with a previously calculated variable threshold value (block 1040). Where the comparison value is less than the previously calculated variable threshold value (block 1040), a pattern found signal is asserted (block 1045).

Figure 5B:
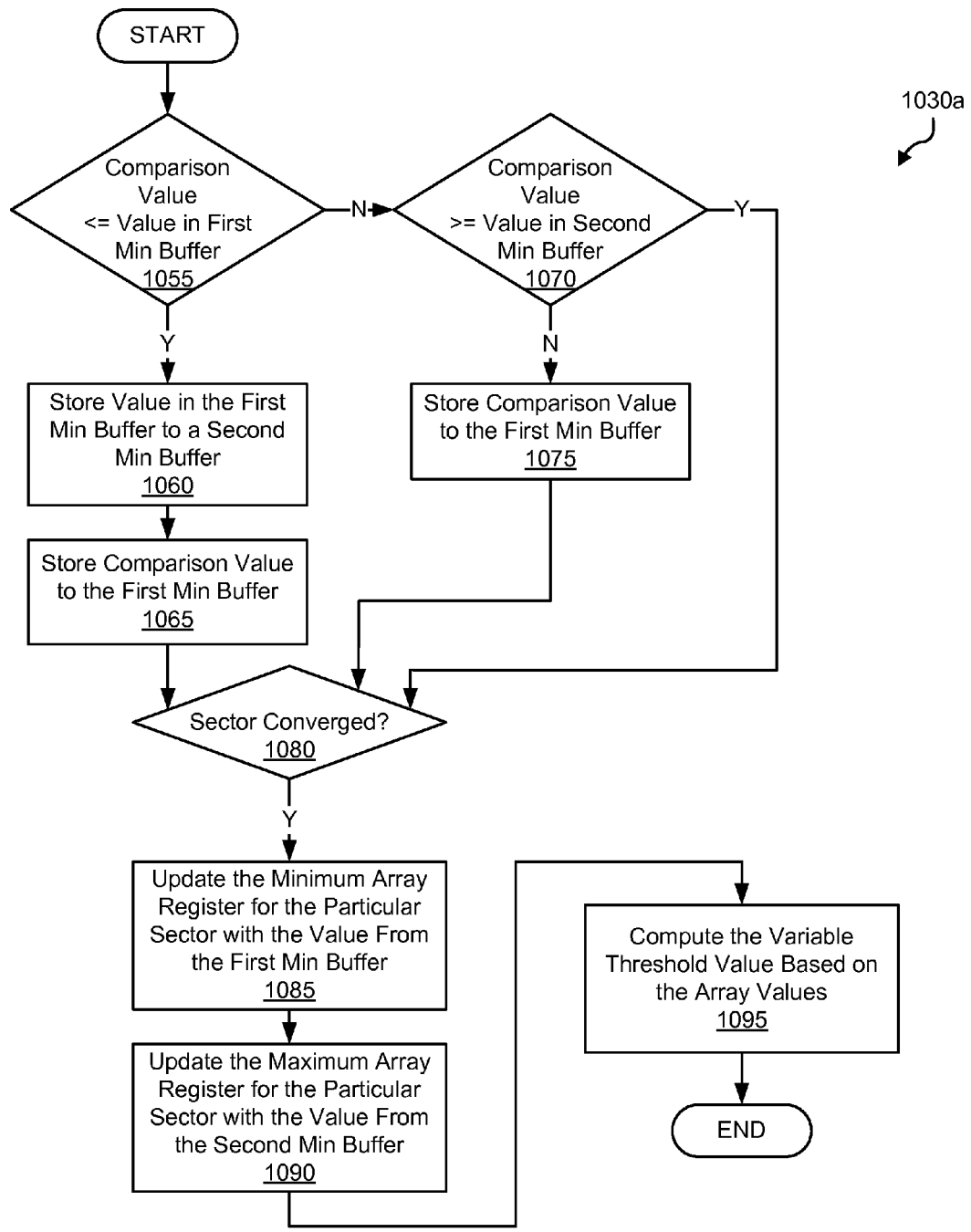
Figure 5C:
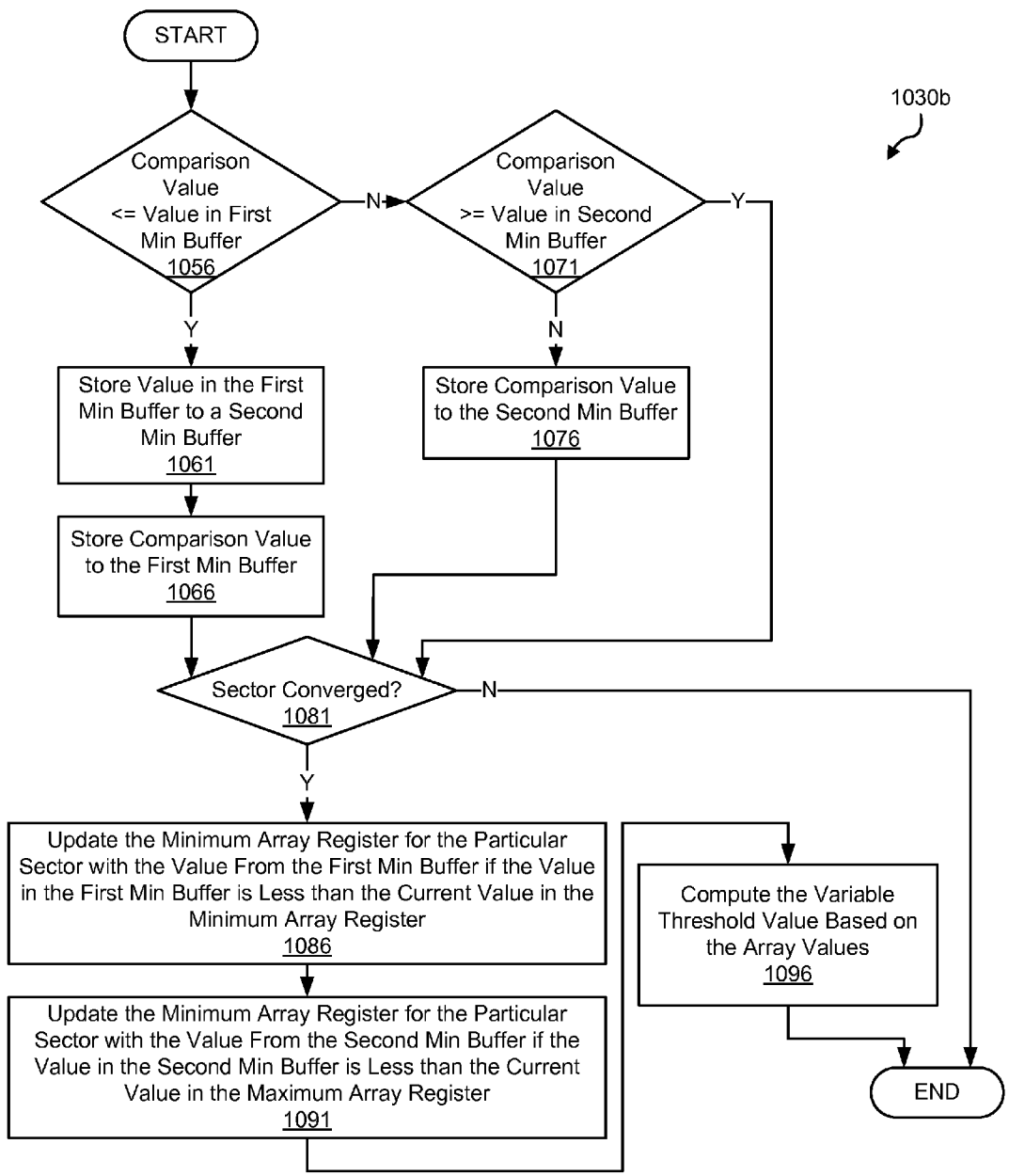

Updating the variable threshold value may be done in a variety of ways—two of which are discussed in relation to FIGS. 5*b*-5*c*. Following a flow diagram 1030*a* of FIG. 5*b*, where the comparison value is less than or equal to the value in the first min buffer (block 1055), the value in the first min buffer is stored to the second min buffer (block 1060). In addition, the comparison value is stored to the first min buffer (block 1065). Alternatively, where the comparison value is greater than the first min buffer (block 1055) and less than the second min buffer (block 1070), the comparison value is stored to the second min buffer (block 1075).

It is then determined whether the sector converged (block 1080). Where the sector converged (block 1080), the values in the first min buffer and the second min buffer are considered valid. In this case, a minimum array register is updated with the value from the first min buffer at a location corresponding to the location in the minimum array register corresponding to the particular sector (block 1085). Further, a maximum array register is updated with the value from the second min buffer at a location corresponding to the location in the minimum array register corresponding to the particular sector (block 1090). The values from the minimum array register and from the maximum array register are used to calculate an updated variable threshold value (block 1095). Such updating may be done in accordance with the following equation:

$$\text{variable threshold value} = \frac{\sum_{i=1}^{N} \text{minimum array register}(i) + \sum_{i=1}^{N} \text{maximum array register}(i)}{2 \times N},$$

where i indicates each sector entry in the respective arrays. It should be noted that in some cases sector convergence is not relied on to qualify the values in the first min buffer and the second min buffer as described above.

Following a flow diagram 1030b of FIG. 5c, where the comparison value is less than or equal to the value in the first min buffer (block 1056), the value in the first min buffer is stored to the second min buffer (block 1061). In addition, the comparison value is stored to the first min buffer (block 1066). Alternatively, where the comparison value is greater than the first min buffer (block 1056) and less than the second min buffer (block 1071), the comparison value is stored to the second min buffer (block 1076).

It is then determined whether the sector converged (block 1081). Where the sector converged (block 1081), the values in the first min buffer and the second min buffer are considered valid. In this case, a minimum array register is updated with the value from the first min buffer where the value in the first min buffer is less than the current value already in the minimum array register (block 1086). In this case, minimum array register holds a single value. A maximum array register is updated with the value from the second min buffer where the value in the second min buffer is less than the current value already in the maximum array register (block 1091). In this case, maximum array register holds a single value. The values from the minimum array register and from the maximum array register are used to calculate an updated variable threshold value (block 1096). Such updating may be done in accordance with the following equation:

$$\text{variable threshold value } 965 = \frac{\text{Maximum} + \text{Minimum}}{2},$$

where Maximum is the value from the maximum array register and Minimum is the value from the minimum array register. It should be noted that in some cases sector convergence is not relied on to qualify the values in the first min buffer and the second min buffer as described above.

Figure 6A:
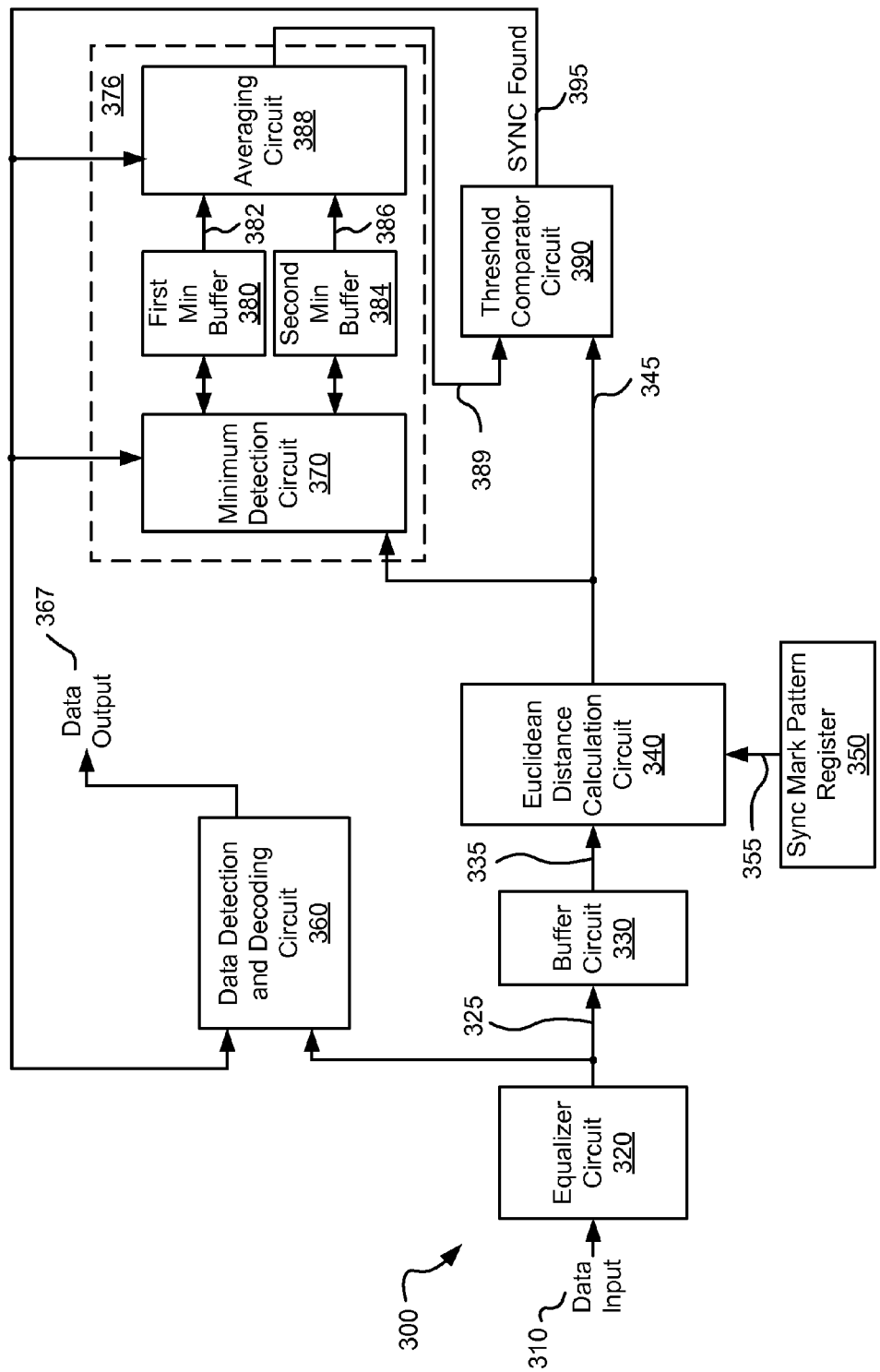
FIG. 6a shows a variable threshold based sync mark detector circuit in accordance with one or more embodiments of the present invention.

Turning to FIG. 6a, a variable threshold based sync mark detector circuit 300 is shown in accordance with one or more embodiments of the present invention. Sync mark detector circuit 300 includes an equalizer circuit 320 that receives a data input 310 and provides an equalized output 325. Equalizer circuit 320 may be any circuit known in the art that is capable of equalizing an input to a defined target and provide an equalized output. Based upon the disclosure provided herein, one of ordinary skill in the art will recognize a variety of equalizer circuits that may be used in relation to different embodiments of the present invention. Data input 310 may be a series of digital values derived from an upstream source such as, for example, a storage medium or a transmission medium. Based upon the disclosure provided herein, one of ordinary skill in the art will recognize a variety of sources for data input 310.

Equalized output 325 is provided to a data detection and decoding circuit 360. Data detection and decoding circuit 360 may be any circuit known in the art for processing a received encoded data set in an attempt to return an original data set. As an example, data detection and decoding circuit 360 may include a maximum a posteriori detector circuit and a low density parity check decoder circuit as are known in the art. Data detection and decoding circuit 360 provides a data output 367. It should be noted that while the discussion provided in relation to this figure suggests that the pattern detection is done on the equalized output, it is possible to perform pattern detection on other available outputs. For example, the pattern detection may be performed directly on data input 310. Based upon the disclosure provided herein, one of ordinary skill in the art will recognize other sources on which pattern detection may be performed.

In addition, equalizer output 325 is provided to a buffer circuit 330 where a number of values of equalized output 325 are maintained. In one embodiment of the present invention, buffer circuit 330 is a shift register circuit as are known in the art. Based upon the disclosure provided herein, one of ordinary skill in the art will recognize a variety of buffer circuits that may be used in relation to different embodiments of the present invention. A buffer output 335 is provided to a Euclidean distance calculation circuit 340 that calculates a distance (e.g., a Euclidean value) between buffered output 335 and a programmed sync mark pattern 355 available from a sync mark pattern register 350. Euclidean value 345 is calculated by squaring the difference between respective bit positions in the compared values, and then summing the resulting squares in accordance with the following equation:

$$\text{Euclidean Value } 345 = \sum_{i=0}^{k} (BO_i - SMP_i)^2$$

where k is the number of bit positions to be compared (e.g., the length of a sync mark pattern or end of preamble pattern to be detected), $BO_i$ is a value of buffered output 335 at a bit position i, and $SMP_i$ is a value of sync mark pattern 355 at a bit position i. Euclidean value 345 is provided to a threshold comparator circuit 390 where it is compared with a variable threshold value 389 that is updated as described below. When Euclidean value 345 is identified as less than variable threshold value 389, threshold comparator circuit 390 asserts a sync found signal 395. Threshold comparator circuit 390 may be any circuit known in the art that is capable of comparing at least two values and providing an output indicative of the comparison. Of note, a sliding window (k-bit positions in length) is moved as data corresponding to successive bit positions is received, and Euclidean value 345 is recalculated each time the sliding window moves.

Variable threshold value 389 is provided by a threshold generation circuit 376. Threshold generation circuit 376 self tunes variable threshold value 389 to match the operational characteristics of the circuit and/or received data input 310. In particular, threshold generation circuit 376 includes a minimum detection circuit 370 that continuously records the minimum of Euclidean value 345 occurring after sync found signal 395 is asserted. The minimums are stored in a first min buffer 380 and a second min buffer 384. In particular, the value stored in first min buffer 380 represents the minimum of Euclidean value 345 received to that point, and the value stored in second min buffer 384 represents the previous minimum of Euclidean value 345. A first minimum value 382 from first min buffer 380 and a second minimum value 386 from second min buffer 384 are provided to an averaging circuit 388. Averaging circuit 388 averages first minimum value 382 with second minimum value 386. When sync found signal 395 is asserted, averaging circuit 388 provides the average of first minimum value 382 and second minimum value 386 as variable threshold value 389.

In operation, data sets are received via data input 310. The received data is equalized by equalizer circuit 320, and the equalized output is processed by a data detection and decoding circuit 360. Data detection and decoding circuit 360 utilizes sync found signal 395 to determine when to start processing a received data set, and provides the processed data set as a data output 367.

In addition, equalized output 325 is buffered and compared with sync mark pattern 355. The comparison may be, for example, a Euclidean distance between the two data sets. The difference between the two data sets is continuously reported as Euclidean value 345. The two minimums of Euclidean value 345 occurring since sync found signal 395 was asserted are averaged by averaging circuit 38. Upon assertion of sync found signal 395, variable threshold value 389 is set equal to the previously computed average from averaging circuit 388. Threshold comparator circuit 390 compares Euclidean value 345 with variable threshold value 389. When Euclidean value 345 is less than variable threshold value 389, threshold comparator circuit 390 asserts sync found signal 395.

Turning to FIG. 6b, a graphical representation 397 of Euclidean value 345 over time relative to variable threshold value 389 is provided. An instance of first minimum value 382 and an instance of second minimum value 386 are shown in a scenario before first minimum value 382 becomes less than variable threshold value 389 triggering an assertion of sync mark signal 395. In this scenario, first minimum value 382 is greater than variable threshold 389, and second minimum value 386 is the next minimum that preceded first minimum value 382.

As shown in FIG. 6c, a graphical representation 398 shows a short time after graphical representation 397 where second minimum value 386 is updated to include the previous first minimum value 382, and first minimum value 382 is updated to include a value that is less than variable threshold 389. This leads to the assertion of sync found signal 395. As shown in FIG. 3d, a graphical representation 399 shows the adjustment of variable threshold 389 that occurs when sync found signal 395 is asserted. Variable threshold 389 is updated to be the average of first minimum value 382 and second minimum value 386. This adjusted variable threshold value 389 is used on a subsequent sync mark detection.

In another embodiment of the present invention, a comparison value (m) is calculated (similar to Euclidean value 345) that is compared with a variable threshold value (similar to variable threshold value 389) to determine whether sync found 395 is to be asserted. The comparison value is calculated in accordance with the following equations:

$$\hat{Y}_i = \sum_{i=0}^{k} t_{k-i} b_k,$$

where $t_i$ are taps of an equalizer circuit and $b_i$ is a channel input;

$$dc = \frac{1}{n}\sum_{i=1}^{n} \hat{Y}_i,$$

$$\hat{r}_i = \hat{Y}_i - dc,$$

$$d = \frac{1}{n}\sum_{i=1}^{n} Y_i, \text{ and}$$

$$m = \sum_{i=1}^{n} (Y_i - d - \hat{r}_i)^2.$$

Where m is less than the variable threshold, sync found signal 395 is asserted. In the embodiment, the threshold generation circuit includes a minimum register (similar to first min buffer 380) and a maximum register (similar to first min buffer 384). In operation the variable threshold value is initialized to a value calculated based upon an ideal channel. Before each sector is processed, the minimum register is initialized to a relatively large value and the maximum register is initialized to a relatively small value. At that juncture, the threshold generation circuit operates in accordance with the following pseudo-code:

---

If (m >= Variable Threshold)
{
    If (m < minimum register)
    {
        set minimum register equal to m
    }
}
Else
{
    If (m >= maximum register)
    {
        set maximum register equal to m;
        Variable Threshold = average of maximum register
        and minimum register
    }
}

---

The values of the Variable Threshold, the minimum register and the maximum register are only re-initialized in the event of a sync mark loss (i.e., failure to identify a sync mark in a sector).

Turning to FIG. 4, a flow diagram 400 shows a method in accordance with one or more embodiments of the present invention for performing variable threshold based sync mark detection. Following flow diagram 400, a data input is received (block 405) and is buffered (block 410). The data input may be a series of digital values derived from an upstream source. For example, the series of digital value may represent samples of data derived from a storage medium. Alternatively, the series of digital values may represent samples of a data signal received via a transmission medium. Based upon the disclosure provided herein, one of ordinary skill in the art will recognize a variety of possible sources of the data input.

The buffered data input is compared against a defined sync mark pattern to yield a comparison value (block 415). The comparison value indicates a level of similarity between the buffered data input and the defined sync mark pattern. As the similarity increases, the comparison value decreases. In one particular embodiment of the present invention, comparing the buffered data input with the defined sync mark pattern includes calculating a Euclidean distance between the two patterns. In such a case, calculating the Euclidean distance is done by squaring the difference between respective bit positions in the compared values, and then summing the resulting squares in accordance with the following equation:

$$\text{Euclidean Distance} = \sum_{i=0}^{k}(BO_i - SMP_i)^2$$

where k is the number of bit positions to be compared, $BO_i$ is a value of the buffered data input at a bit position i, and $SMP_i$ is a value of the sync mark pattern at a bit position i.

A value previously stored in a first min buffer is stored to a second min buffer (block 420), and the comparison value is stored to the first min buffer (block 425). In this way, two preceding minimum values are maintained. In addition, the comparison value is compared with a variable threshold value (bock 430). Where the comparison value is less than the variable threshold value (block 430), a sync found signal is asserted (block 435). The variable threshold value is then modified by averaging the values stored in the first min buffer and the value stored in the second min buffer (block 440). This modified variable threshold value is used on a subsequent attempt to identify a sync mark. In this way, the threshold for determining whether a sync mark is found is tuned and thereby allowing for identification of an optimum threshold. This optimum threshold operates to minimize the probability of incorrect detection of a sync mark. The probability distribution depends on the channel characteristics/noise and is not available a priori. As such, various embodiments of the present invention providing for self tuning a variable threshold value adjusts for the aforementioned probability distribution.

Figure 8:
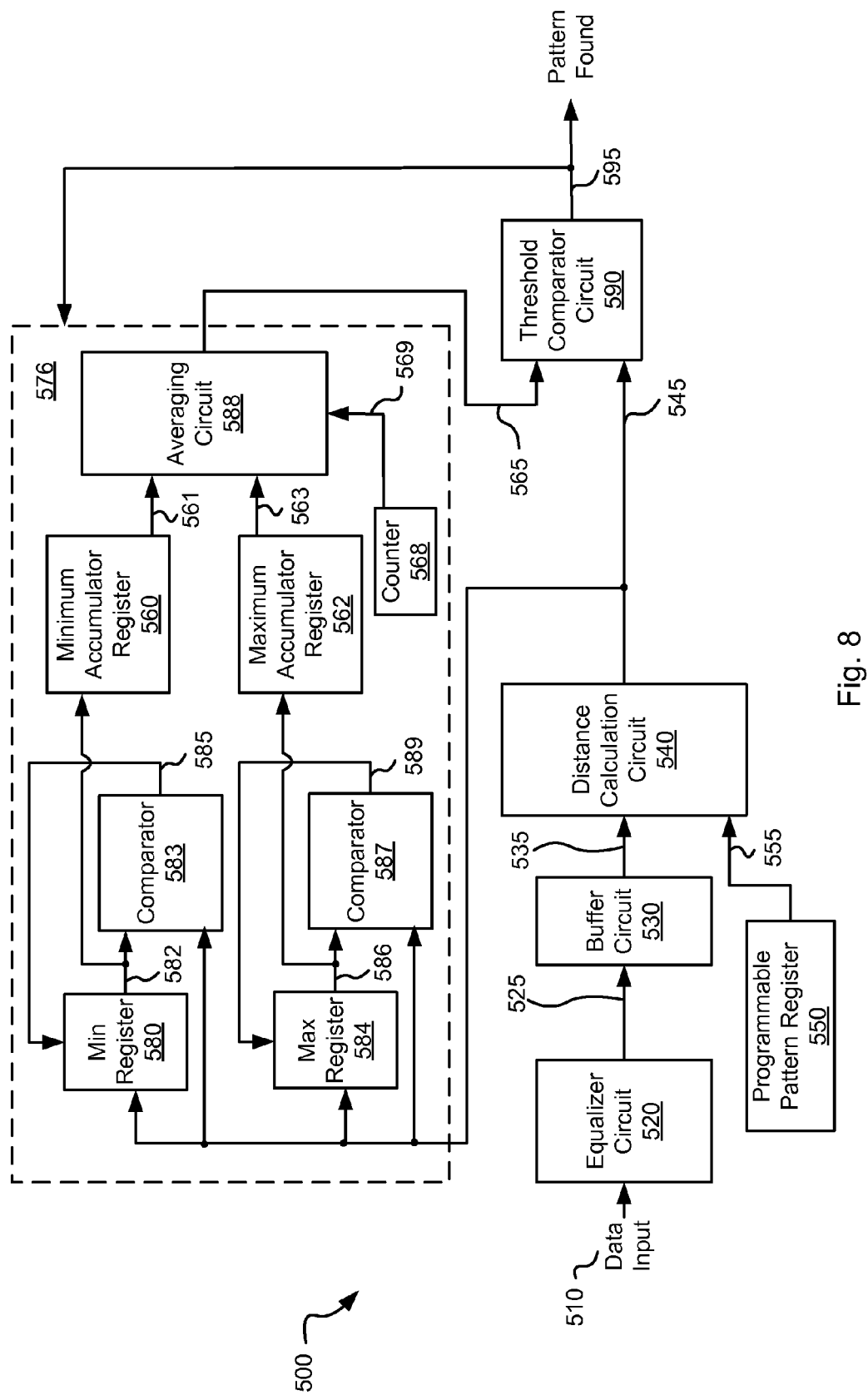
FIG. 8 shows a variable threshold based pattern detector circuit in accordance with one or more embodiments of the present invention.

Turning to FIG. 8, a variable threshold based pattern detector circuit 500 is shown in accordance with one or more embodiments of the present invention. Pattern detector circuit 500 may be used to detect any particular pattern. For example, pattern detector circuit 500 may be used to detect an end of preamble. Pattern detector circuit 500 includes an equalizer circuit 520 that receives a data input 510 and provides an equalized output 525. Equalizer circuit 520 may be any circuit known in the art that is capable of equalizing an input to a defined target and provide an equalized output. Based upon the disclosure provided herein, one of ordinary skill in the art will recognize a variety of equalizer circuits that may be used in relation to different embodiments of the present invention. Data input 510 may be a series of digital values derived from an upstream source such as, for example, a storage medium or a transmission medium. Based upon the disclosure provided herein, one of ordinary skill in the art will recognize a variety of sources for data input 510.

Equalizer output 525 is provided to a buffer circuit 530 where a number of values of equalized output are maintained. In one embodiment of the present invention, buffer circuit 530 is a shift register circuit as are known in the art. Based upon the disclosure provided herein, one of ordinary skill in the art will recognize a variety of buffer circuits that may be used in relation to different embodiments of the present invention. A buffer output 535 is provided to a distance calculation circuit 540 that calculates a distance between buffered output 535 and a programmed pattern 555 available from a programmable pattern register 550. Distance value 545 is calculated in accordance with the following equations:

$$\hat{Y}_i = \sum_{i=0}^{k} t_{k-i} b_k,$$

where $t_i$ are taps of an equalizer circuit and $b_i$ is a channel input;

$$dc = \frac{1}{n}\sum_{i=1}^{n}\hat{Y}_i,$$

$$\hat{r}_i = \hat{Y}_i - dc,$$

$$d = \frac{1}{n}\sum_{i=1}^{n} Y_i, \text{ and}$$

$$\text{Distance Value } 545 = \sum_{i=1}^{n}(Y_i - d - \hat{r}_i)^2.$$

Distance value 545 is provided to a threshold comparator circuit 590 where it is compared with a variable threshold value 565 that is updated as described below. When distance value 545 is identified as less than variable threshold value 565, threshold comparator circuit 590 asserts a pattern found signal 595. Threshold comparator circuit 590 may be any circuit known in the art that is capable of comparing at least two values and providing an output indicative of the comparison.

Variable threshold value 565 is provided by a threshold generation circuit 576. Threshold generation circuit 576 self tunes variable threshold value 389 to match the operational characteristics of the circuit received data input 510. In particular, threshold generation circuit 576 includes a minimum register 580 that provides a minimum value 582, a maximum register 584 that provides a maximum value 586. A comparator 583 compares minimum value 582 with distance value 545 to yield a comparator output 585, and a comparator 587 compares maximum value 586 with distance value 545 to yield a comparator output 589. Minimum value 582 is provided to a minimum accumulator register 560, and maximum value 586 is provided to a maximum accumulator register 562. A minimum accumulator value 561 from minimum accumulator register 560 and a maximum accumulator value 563 from maximum accumulator register 562 are provided to an averaging circuit 588 along with a counter value 569 from a counter 568. Counter value 569 indicates the number of values accumulated in minimum accumulator register 560 and maximum accumulator register 562. The result of the averaging performed by averaging circuit 588 is provided as variable threshold value 565.

In operation, data sets are received via data input 510. The received data is equalized by equalizer circuit 520, and the equalized output is stored in buffer circuit 530. Distance calculation circuit 540 calculates a difference between the buffered equalized input 535 and programmed pattern 555. The difference between the two data sets is continuously reported as distance value 545.

Threshold generation circuit 576 is initialized by setting variable threshold value 565 to a value calculated based upon an ideal channel, minimum accumulator register 560, maximum accumulator register 565, and counter 568 are initialized to zero. Before each sector is processed, minimum register 580 is initialized to a relatively large value (i.e., above variable threshold 565) and maximum register 584 is initialized to a relatively small value (i.e., below variable threshold 565). At that juncture, threshold generation circuit 576 operates in accordance with the following pseudo-code:

```
If (distance Value 545 >= Variable Threshold Value 565)
{
   If (Distance Value 545 < minimum value 582)
   {
      set minimum value 582 equal to distance value 545
   }
}
Else if (Distance Value 545 < Variable Threshold Value 565)
{
   assert pattern found signal 595;
   If (Distance Value 545 >= maximum value 586)
   {
      set maximum value 586 equal to distance value 545;
      minimum accumulator register 560 = minimum accumulator value 561 + minimum value 582;
      maximum accumulator register 565 = maximum accumulator value 563 + maximum value 586;
      counter value 569 = counter value 569 +1;
      Variable Threshold Value 565 =
```

$$\frac{\text{maximum accumulator value 563} + \text{minimum accumulator value 561}}{2 * \text{counter value 569}}$$

```
   }
}
```

Variable threshold value 565, minimum accumulator value 561 and maximum accumulator value 566 are only re-initialized in the event of an inability to identify the defined pattern in a prescribed period.

Figure 9:
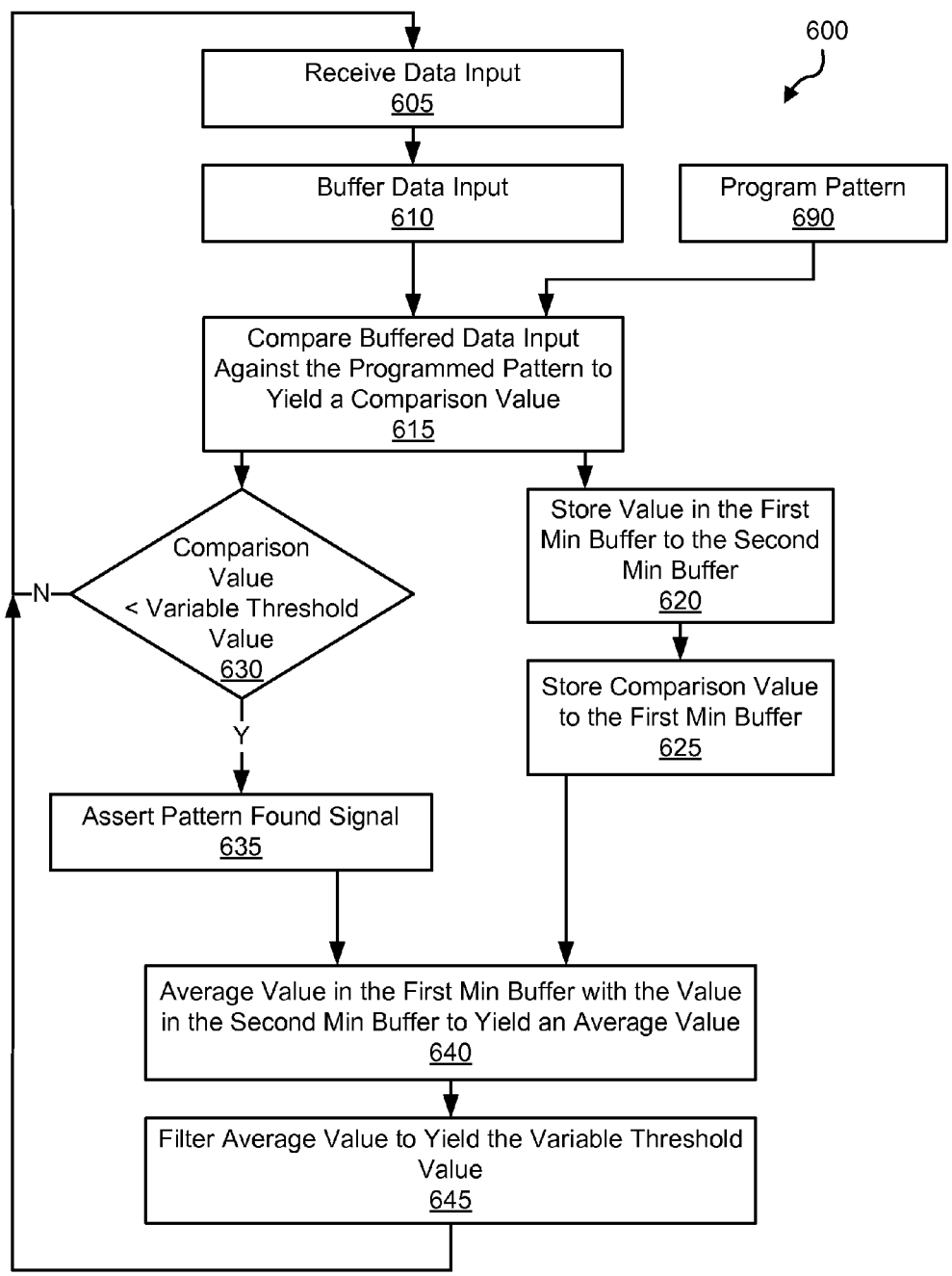
FIG. 9 is a flow diagram showing a method in accordance with one or more embodiments of the present invention for performing variable threshold based pattern detection.

Turning to FIG. 9, a flow diagram 600 shows a method in accordance with some embodiments of the present invention for performing variable threshold based pattern detection. Following flow diagram 600, a data input is received (block 605) and is buffered (block 610). The data input may be a series of digital values derived from an upstream source. For example, the series of digital value may represent samples of data derived from a storage medium. Alternatively, the series of digital values may represent samples of a data signal received via a transmission medium. Based upon the disclosure provided herein, one of ordinary skill in the art will recognize a variety of possible sources of the data input.

A defined pattern to be detected is programmed (block 690). The buffered data input is compared against the programmed pattern to yield a comparison value (block 615). The comparison value indicates a level of similarity between the buffered data input and the defined sync mark pattern. As the similarity increases, the comparison value decreases. In one particular embodiment of the present invention, comparing the buffered data input with the defined sync mark pattern includes calculating a Euclidean distance between the two patterns. In such a case, calculating the Euclidean distance is done by squaring the difference between respective bit positions in the compared values, and then summing the resulting squares in accordance with the following equation:

$$\text{Euclidean Distance} = \sum_{i=0}^{k} (BO_i - SMP_i)^2$$

where k is the number of bit positions to be compared, $BO_i$ is a value of the buffered data input at a bit position i, and $SMP_i$ is a value of the sync mark pattern at a bit position i.

A value previously stored in a first min buffer is stored to a second min buffer (block 420), and the comparison value is stored to the first min buffer (block 625). In this way, two preceding minimum values are maintained. In addition, the comparison value is compared with a variable threshold value (bock 630). Where the comparison value is less than the variable threshold value (block 630), a sync found signal is asserted (block 635). An average value is then calculated by averaging the values stored in the first min buffer and the value stored in the second min buffer (block 640). The averaged value is then filtered to yield the variable threshold value (block 645). This filtering may be applied by limiting the amount of change that can occur in the variable threshold value at any given time, by limiting the amount of change that can occur in any of the first min buffer and the second min buffer at any given time, or by using an accumulator similar to that discussed above in relation to FIG. 8. Based upon the disclosure provided herein, one of ordinary skill in the art will recognize other filtering approaches that may be used in relation to different embodiments of the present invention. The variable threshold value is used on a subsequent attempt to identify a defined pattern. In this way, the threshold for determining whether a pattern is found is tuned and thereby allowing for identification of an optimum threshold. This optimum threshold operates to minimize the probability of incorrect detection of a sync mark.

Figure 7:
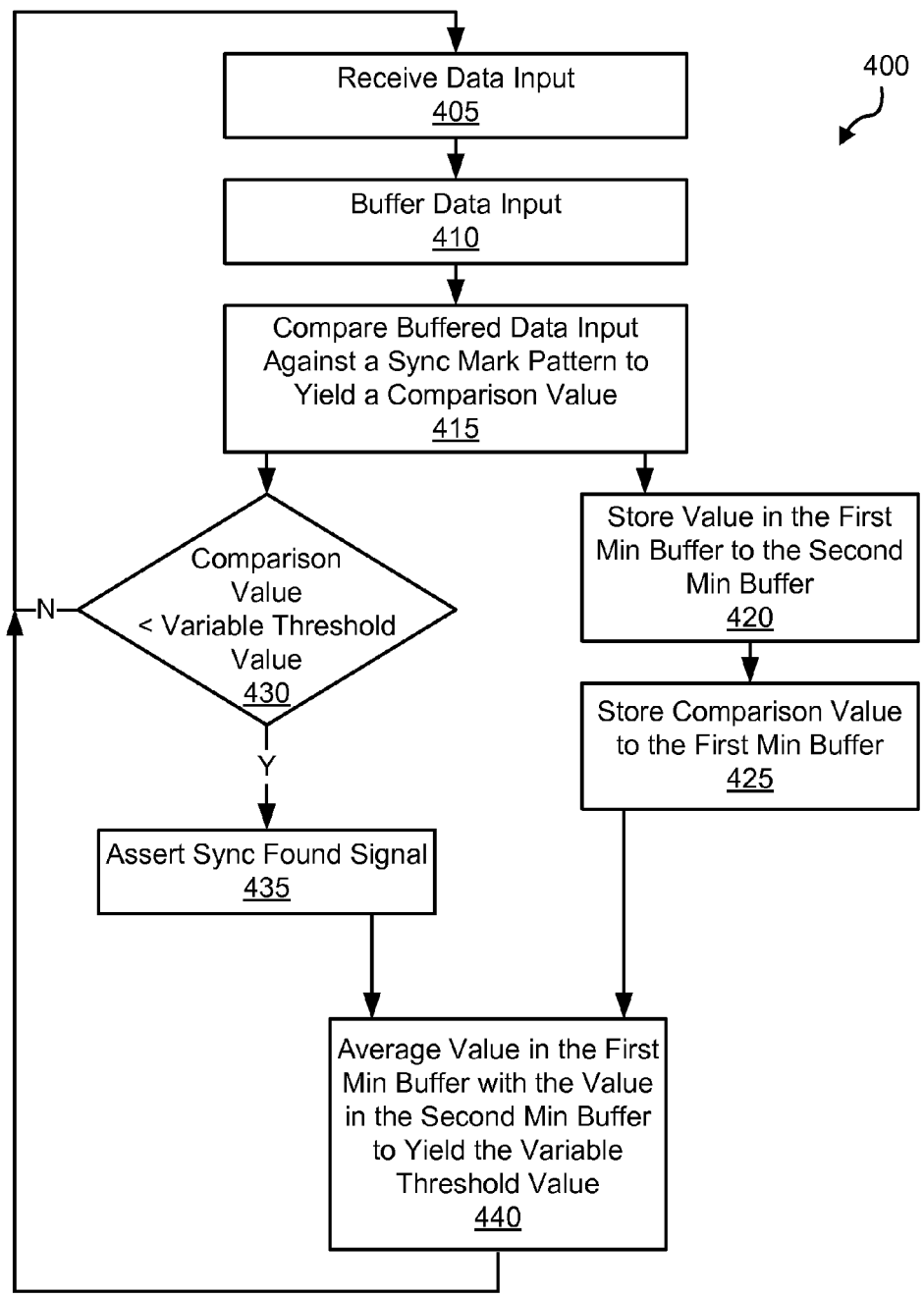
FIG. 7 is a flow diagram showing a method in accordance with one or more embodiments of the present invention for performing variable threshold based sync mark detection.
Figure 10:
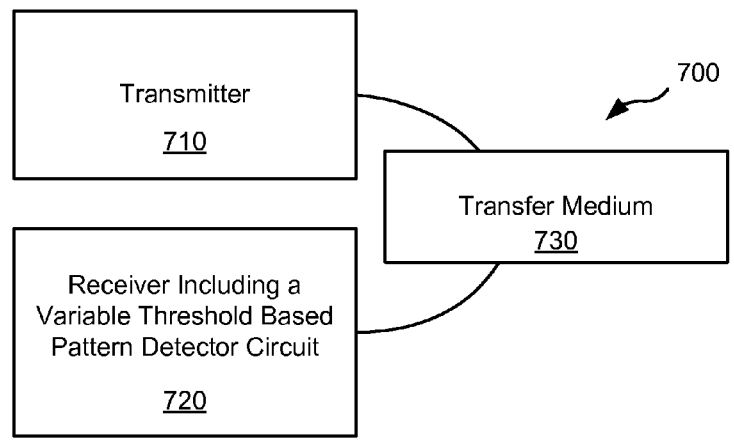
FIG. 10 depicts a communication system including a non-threshold based sync mark detector circuit in accordance with different embodiments of the present invention.

Turning to FIG. 10, a communication system 700 including a receiver 720 with a variable threshold based pattern detector circuit is shown in accordance with different embodiments of the present invention. Communication system 700 includes a transmitter 710 that is operable to transmit encoded information via a transfer medium 730 as is known in the art. The encoded data is received from transfer medium 730 by receiver 720. Receiver 720 incorporates the variable threshold based pattern detector circuit. The variable threshold based pattern detector circuit may be similar to that discussed above in relation to one or more of relation to FIGS. 4, 6, 8 and/or may operate in accordance with one of the methods discussed above in relation to FIGS. 5, 7, 9.

Figure 11:
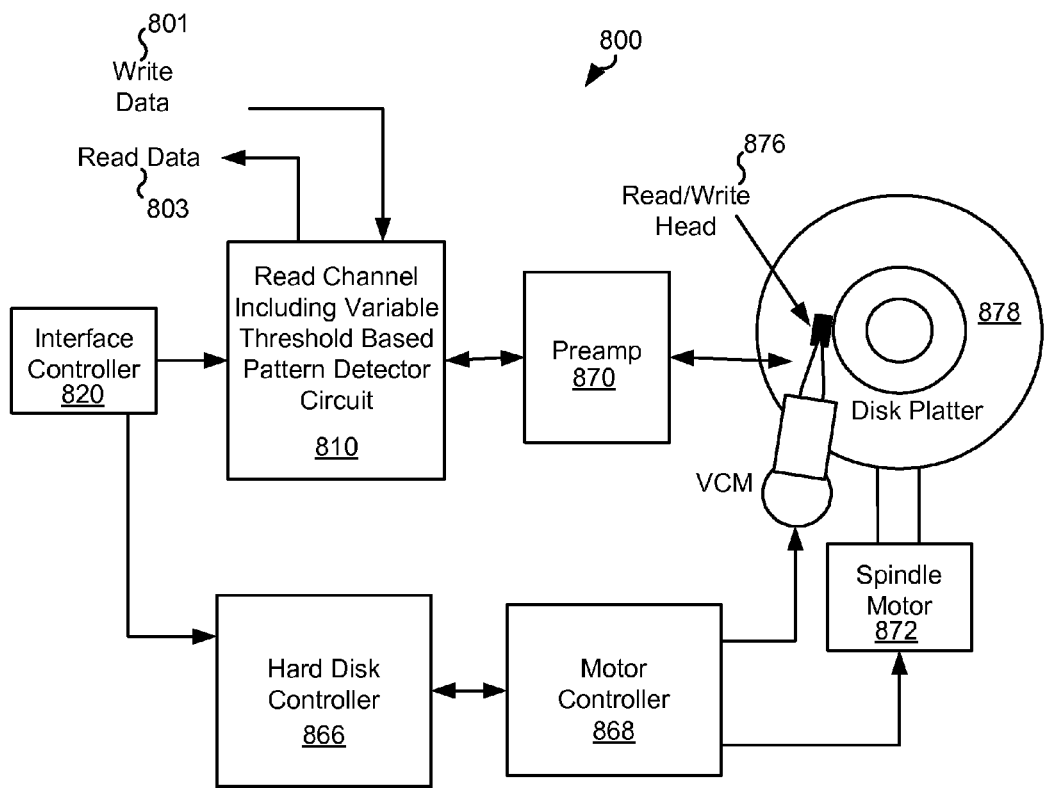
FIG. 11 shows a storage system including a variable threshold based sync mark detector circuit in accordance with some embodiments of the present invention.

Turning to FIG. 11, a storage system 800 including a read channel circuit 810 with a variable threshold based pattern detector circuit is shown in accordance with various embodiments of the present invention. Storage system 800 may be, for example, a hard disk drive. Storage system 800 also includes a preamplifier 870, an interface controller 820, a hard disk controller 866, a motor controller 868, a spindle motor 872, a disk platter 878, and a read/write head 876. Interface controller 820 controls addressing and timing of data to/from disk platter 878. The data on disk platter 878 consists of groups of magnetic signals that may be detected by read/write head assembly 876 when the assembly is properly positioned over disk platter 878. In one embodiment, disk platter 878 includes magnetic signals recorded in accordance with either a longitudinal or a perpendicular recording scheme.

In a typical read operation, read/write head assembly 876 is accurately positioned by motor controller 868 over a desired data track on disk platter 878. Motor controller 868 both positions read/write head assembly 876 in relation to disk platter 878 and drives spindle motor 872 by moving read/write head assembly to the proper data track on disk platter 878 under the direction of hard disk controller 866. Spindle motor 872 spins disk platter 878 at a determined spin rate (RPMs). Once read/write head assembly 878 is positioned adjacent the proper data track, magnetic signals representing data on disk platter 878 are sensed by read/write head assembly 876 as disk platter 878 is rotated by spindle motor 872. The sensed magnetic signals are provided as a continuous, minute analog signal representative of the magnetic data on disk platter 878. This minute analog signal is transferred from read/write head assembly 876 to read channel module 864 via preamplifier 870. Preamplifier 870 is operable to amplify the minute analog signals accessed from disk platter 878. In turn, read channel circuit 810 decodes and digitizes the received analog signal to recreate the information originally written to disk platter 878. This data is provided as read data 803 to a receiving circuit. As part of decoding the received information, read channel circuit 810 performs a pattern detection process. Such a pattern detection process may be performed using a pattern detector circuit that may be similar to one or more of those discussed above in relation to FIGS. 4, 6, 8 and/or may operate in accordance with one of the methods discussed above in relation to FIGS. 5, 7, 9. A write operation is substantially the opposite of the preceding read operation with write data 801 being provided to read channel circuit 810. This data is then encoded and written to disk platter 878.

It should be noted that storage system 800 may be integrated into a larger storage system such as, for example, a RAID (redundant array of inexpensive disks or redundant array of independent disks) based storage system. It should also be noted that various functions or blocks of storage system 800 may be implemented in either software or firmware, while other functions or blocks are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A pattern detection circuit, the circuit comprising:
   a distance calculation circuit operable to calculate: a first distance value corresponding to a difference between a first pattern and a second pattern, and a second distance value corresponding to a difference between a third pattern and the second pattern;
   a threshold comparator circuit operable to compare the first distance value to a variable threshold value; and
   a threshold value calculation circuit, wherein the threshold value calculation circuit is operable to modify the variable threshold value based at least in part on the first distance value and the second distance value, wherein the first distance value is less than the variable threshold value.

2. The circuit of claim 1, wherein the circuit is implemented as part of an integrated circuit.

3. The circuit of claim 1, wherein the circuit is implemented as part of a device selected from a group consisting of: a storage device and a wireless communication device.

4. The circuit of claim 1, wherein the second distance value is greater than the variable threshold value.

5. The circuit of claim 1, wherein the threshold value calculation circuit comprises:
   a first register circuit operable to store the first distance value when the first distance value is less than a current minimum value in the first register; and
   an averaging circuit, wherein the averaging circuit is operable to average a derivative of the maximum value from the second register and a derivative of the minimum value from the first register to yield the variable threshold value, and to provide a resulting average as the variable threshold value.

6. The circuit of claim 5, wherein the derivative of the maximum value from the second register is the maximum value from the second register, and wherein the derivative of the minimum value from the first register is the minimum value from the first register.

7. The circuit of claim 1, wherein the threshold value calculation circuit comprises:
   a first register circuit operable to store the first distance value when the first distance value is less than a current minimum value in the first register;
   a second register circuit operable to store the first distance value when the distance value is greater than a maximum value currently stored in the second register;
   a first accumulator circuit operable to accumulate the instances of the first distance value that are less than the variable threshold value and to provide a first accumulated value;

a second accumulator circuit operable to accumulate instances of the first distance value that are greater than the variable threshold value and to provide a second accumulated value; and a counter circuit operable to count a number of values stored in the first accumulator circuit and the second accumulator circuit.

8. The circuit of claim 7, wherein the threshold value calculation circuit further comprises:

an averaging circuit, wherein the averaging circuit is operable to average the first accumulated value and the second accumulated value to yield an average value, and to divide the average value by the number of values to yield the variable threshold value.

9. The circuit of claim 1, wherein the threshold comparator circuit is further operable to assert a pattern found signal when the first distance value is less than the variable threshold value.

10. The circuit of claim 1, wherein the second pattern is selected from a group consisting of: a defined sync mark pattern, and a defined end of preamble pattern.

11. The circuit of claim 1, wherein the circuit further comprises:

a pattern register, wherein the pattern register is programmable and maintains the second pattern.

12. The circuit of claim 1, wherein the first pattern is received as a data input.

13. A method for pattern detection, the method comprising:

receiving a first data input and a second data input;

calculating a difference between the first data input and a defined pattern to yield a first comparison value, wherein the first comparison value is greater than a variable threshold value; and modifying the variable threshold value based at least in part on a second comparison value; and wherein modifying the variable threshold value based at least in part on the second comparison value includes averaging the first comparison value and the second comparison value, and providing the resulting average as the variable threshold value.

14. The method of claim 13, wherein modifying the variable threshold value based at least in part on the second comparison value includes:

accumulating the second comparison value with at least one other comparison value that was less than a preceding variable threshold value to yield a first accumulated value;

accumulating the first comparison value with at least one other comparison value that was greater than a preceding variable threshold value to yield a second accumulated value; and averaging the first accumulated value and the second accumulated value, and providing the resulting average as the variable threshold value.

15. The method of claim 13, wherein the method further comprises:

asserting a pattern found signal based at least in part on the second comparison value being less than the variable threshold value.

16. A storage device, the storage device comprising:

a storage medium;

a data processing circuit operable to receive a data input derived from the storage medium, wherein the date processing circuit comprises:

a distance calculation circuit operable to calculate a first distance value corresponding to a difference between a first pattern and a second pattern, and a second distance value corresponding to a difference between a third pattern and the second pattern, and wherein the first pattern is derived from the data input;

a threshold comparator circuit operable to compare the first distance value to a variable threshold value; and a threshold value calculation circuit, wherein the threshold value calculation circuit is operable to modify the variable threshold value based at least in part on the first distance value and the second distance value, and wherein the first distance value is less than the variable threshold value.

17. The storage device of claim 16, wherein the threshold value calculation circuit comprises:

a first register circuit operable to store the first distance value when the first distance value is less than a current minimum value in the first register;

a second register circuit operable to store the distance value when the first distance value is greater than a maximum value currently stored in the second register; and an averaging circuit, wherein the averaging circuit is operable to average a derivative of the maximum value from the second register and a derivative of the minimum value from the first register to yield the variable threshold value, and to provide a resulting average as the variable threshold value.

18. The storage device of claim 16, wherein the threshold calculation circuit comprises:

a first register circuit operable to store the first distance value when the first distance value is less than a current minimum value in the first register;

a second register circuit operable to store the first distance value when the first distance value is greater than a maximum value currently stored in the second register;

a first accumulator circuit operable to accumulate instances of the first distance value that are less than the variable threshold value and to provide a first accumulated value;

a second accumulator circuit operable to accumulate the instances of the first distance value that are greater than the variable threshold value and to provide a second accumulated value;

a counter circuit operable to count a number of value stored in the first accumulator circuit and the second accumulator circuit; and an averaging circuit, wherein the averaging circuit is operable to average the first accumulated value and the second accumulated value to yield an average value, and to divide the average value by the number of values to yield the variable threshold value.

19. The storage device of claim 16, wherein the second distance value is greater than the variable threshold value.

20. The storage device of claim 17, wherein the derivative of the maximum value from the second register is the maximum value from the second register, and wherein the derivative of the minimum value from the first register is the minimum value from the first register.

* * * * *